(12) United States Patent
Smithson et al.

(10) Patent No.: US 10,596,947 B2
(45) Date of Patent: Mar. 24, 2020

(54) CUP HOLDER

(71) Applicant: NIFCO AMERICA CORP., Canal Winchester, OH (US)

(72) Inventors: Randy Smithson, Canal Winchester, OH (US); Akihiko Hirose, Canal Winchester, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 580 days.

(21) Appl. No.: 15/422,822

(22) Filed: Feb. 2, 2017

(65) Prior Publication Data
US 2018/0215301 A1 Aug. 2, 2018

(51) Int. Cl.
*B60N 3/10* (2006.01)
*A47G 23/02* (2006.01)
*B65D 25/10* (2006.01)

(52) U.S. Cl.
CPC ......... *B60N 3/105* (2013.01); *A47G 23/0216* (2013.01); *A47G 23/0225* (2013.01); *A47G 23/0241* (2013.01); *B60N 3/106* (2013.01); *B65D 25/10* (2013.01)

(58) Field of Classification Search
CPC .......... B60N 3/10; B60N 3/105; B60N 3/106; B60N 3/108; A47G 23/0216; A47G 23/0241; A47G 23/0266; B65D 25/00; B65D 25/02; B65D 25/10; B65D 25/101
USPC ...... 220/737; 224/926; 248/311.2; 296/37.8; 211/71.01; 297/188.14
See application file for complete search history.

(56) References Cited

U.S. PATENT DOCUMENTS

| 7,694,928 | B2 * | 4/2010 | Lee | B60N 3/101 |
| | | | | 224/281 |
| 8,579,149 | B2 | 11/2013 | Henke et al. | |
| 9,221,581 | B2 | 12/2015 | Yokota et al. | |
| 2013/0105536 | A1 | 5/2013 | Simon et al. | |
| 2014/0367433 | A1 * | 12/2014 | Rifel | B60N 3/105 |
| | | | | 224/485 |
| 2015/0201780 | A1 * | 7/2015 | Yokota | B65D 21/08 |
| | | | | 220/720 |

(Continued)

FOREIGN PATENT DOCUMENTS

| DE | 29920019 U1 | 1/2000 |
| JP | 2013-107456 A | 6/2013 |
| JP | 2015-136976 A | 7/2015 |

*Primary Examiner* — Andrew T Kirsch
*Assistant Examiner* — Jennifer Castriotta
(74) *Attorney, Agent, or Firm* — Manabu Kanesaka

(57) ABSTRACT

A cup holder including a case for receiving a cup, having an opening and a bottom opposite to the opening; a rotational arm including a first arm member rotatably connected to the case, and a second arm member rotatably connected to the first arm member and having a retaining member for holding the cup; and a platform slidably arranged in the case to move between a first position in which the platform is positioned at the opening of the case, and a second position in which the platform is positioned at the bottom of the case, the platform an abutting portion extending downwardly therefrom to abut against the first arm member. When the platform moves from the first position to the second position, the abutting portion abuts against the first arm member to rotate the rotational arm toward the case and the retaining member is disposed inside the case.

7 Claims, 9 Drawing Sheets

(56) References Cited

U.S. PATENT DOCUMENTS

2015/0251582 A1\* 9/2015 Sawada .................... B60N 3/10
                                                    220/737
2018/0029514 A1\* 2/2018 Salinas .................. B60N 3/105

\* cited by examiner

CUP HOLDER

FIELD OF THE INVENTION

The present invention relates to a cup holder for an automobile. More specifically, the present invention relates to a cup holder having a platform covering an opening of the cup holder to have a flush surface appearance when not in use, and a retaining arm to retain a cup or a beverage container received inside the cup holder.

BACKGROUND OF THE INVENTION

For an example of a conventional variable depth cup holder, PTL 1 is referred to. FIG. 8A of the present application shows a perspective view of the variable depth conventional cup holder of PTL 1 in an unused state. The variable depth conventional cup holder of PTL 1 includes a surrounding housing 02, a supporting element 03 disposed movably in the surrounding housing 02, a bottom element 05 arranged to be flush with an upper surface of the surrounding housing 02, and a compression spring (not shown) disposed between the bottom element 05 and the housing 02.

FIG. 8B of the present application shows a perspective view of the variable depth conventional cup holder of PTL 1 in a using state wherein the supporting element 03 is outside of the surrounding housing 02 to support the cup, and a drinking vessel receptacle 04 defining a receiving space for the cup is exposed. On an inner circumferential surface of the supporting element 03, retaining elements 15 rotating on a vertical axis are disposed to retain the cup. Each of the retaining elements 15 is urged by a spring toward a center of the supporting element 03 so that when the supporting element 03 is lifted from the surrounding housing 02, the retaining elements 15 rotate from the inner circumferential surface of the supporting element 03 toward the center of the supporting element 03 and apply an urging force (retaining force) from the springs to retain the cup placed inside the drinking vessel receptacle 04.

For another example of a variable depth conventional cup holder, PTL 2 is referred to. FIG. 9A of the present application shows a perspective view of the variable depth conventional cup holder of PTL 2 in an unused state. The variable depth conventional cup holder of PTL 2 includes a housing 12 having a cylindrical body portion 13, a support assembly 32 slidably received in an interior 36 of the housing 12, and a dampening system 20 including a dampening wheel 28. The housing 12 further includes a housing slot 26 for housing the dampening system 20, and a toothed bar 22 arranged adjacent to the housing slot 26 to engage the dampening wheel 28. As shown in FIG. 9A, in the unused state, a top surface 34 of the support assembly 32 is substantially flush to the upper end of the housing 12.

FIG. 9B of the present application shows a perspective view of the variable depth conventional cup holder of PTL 2 in a using state. When the user of the variable depth conventional cup holder of PTL 2 presses the top surface 34 of the support assembly 32, the dampening system 20 moves downward within the housing slot 26, and simultaneously, the dampening wheel 28 moves along the toothed bar 22 to damp the vertical movement of the support assembly 32 and a latching mechanism (not shown) retains the support assembly 32 at the lower end of the housing 12.

CITATION LIST

Patent Document

PTL 1: U.S. Pat. No. 8,579,149 B2
PTL 2: US Publication 2013-0105536 A1

PROBLEMS TO BE SOLVED BY THE INVENTION

In a structure of the cup holder in PTL 1, the retaining elements 15 rotate from the inner circumferential surface of the supporting element 03 toward the center of the supporting element 03 after the supporting element 03 is lifted from the surrounding housing 02. For returning the cup holder in PTL 1 from the using state to unused state, the compression spring between the bottom element 05 and the housing 02 applies an urging force on the bottom element 05 to move the bottom element 05 upward, and the bottom element 05 abuts against the retaining elements 15. The retaining elements 15 rotate back to the inner circumferential surface of the supporting element 03, and the bottom element 05 reaches the upper surface of the surrounding housing 02; thereby, the cup holder is in the unused state. Thus, the retaining force of the springs for the retaining elements 15 must be weaker than the compression spring to allow the bottom element 05 to move upward against said retaining force of the retaining elements 15.

In addition, since the user applies force to the bottom element 05 against the urging force of the compression spring to move the bottom element 05 to the using state, the compression spring cannot be a spring with a strong urging force, which will make the placement of the cup into the cup holder difficult. Thus, the retaining force of the retaining elements 15 must be weak.

In a structure of the cup holder in PTL 2, the cup holder in PTL 2 does not have a structure corresponding to the retaining element to retain the cup in the using state. Thus, the cup holder in PTL 2 cannot securely retain the cup.

Therefore, the present invention is made in view of the aforementioned problems that a conventional technology has, and an object of the present invention is to provide a cup holder covering an opening of the cup holder to have a flush surface appearance when not in use for aesthetic purpose and having a retaining element with a strong retaining force.

MEANS FOR SOLVING THE PROBLEMS

In order to obtain the aforementioned object, in the present invention, a cup holder for holding a case for receiving the cup, having an opening and a bottom opposite to the opening; a rotational arm rotatably connected to the case, and including a first arm member rotatably connected to the case, and a second arm member rotatably connected to the first arm member, and having a retaining member protruding toward the case for retaining the cup; a platform slidably arranged in the case to move between a first position in which the platform is positioned at the opening of the case, and a second position in which the platform is positioned at the bottom of the case, the platform having an abutting portion extending downwardly therefrom to abut against the first arm member; and a latch unit to latch the platform and the bottom of the case when the platform is in the second position. When the platform moves from the first position to the second position, the abutting portion abuts against the first arm member to rotate the rotational arm toward the case and the retaining member is disposed inside the case.

In the present invention, the first arm member includes a body portion aligned to the second arm member, and having one end rotatably connected to the second arm member and another end rotatably connected to an outer surface of the case, and a contacting portion extending from the another end of the body portion to the inside of the case to abut against the abutting portion of the platform.

In the present invention, the rotational arm further comprises a first urging portion disposed between the first arm member and the case for applying an urging force to the rotational arm toward outside of the case, and a second urging portion disposed between the first arm member and the second arm member for applying an urging force to the second arm member toward the inside of the case, and the urging force of the second urging portion is greater than that of the first urging portion.

The present invention may include an urging member arranged between the platform and the case to urge the platform toward the opening of the case. When the platform is in the first position, the retaining member of the second arm member is outside of the case and the contacting portion of the first arm member is inside the case. When the platform moves from the first position to the second position, the platform is moved against an urging force of the urging member and the abutting portion of the platform abuts against the contacting portion of the first arm member to rotate the rotational arm toward the case. When the platform is in the second position, the platform is latched to the bottom of the case through the latch unit and the retaining member of the second arm member protrudes inside the case for retaining the cup, and when the platform moves from the second position to the first position, the platform is unlatched from the bottom of the case and the urging member urges the platform to move toward the opening of the case and rotate the rotational arm away from the case.

In the present invention, the case further includes a first slot arranged between the opening of the case and the bottom of the case, to allow the retaining member of the second arm member to enter inside the case, and a second slot arranged between the first slot and the bottom of the case and extending into the bottom, to allow the contacting portion of the first arm member to enter inside the case. When the platform is in the first position, the contacting portion of the first arm member is disposed inside the case through the second slot to abut against the abutting portion of the platform, and when the platform is in the second position, the retaining member of the second arm member protrudes inside the case through the first slot for retaining the cup.

In the present invention, the case further includes a guide portion arranged on the outer surface of the case and having a plurality of teeth extending from the opening of the case to the bottom of the case, and the platform further comprises a gear arranged on an outer surface of the platform to engage the plurality of teeth of the guide portion.

According to such configuration, the abutting portion of platform abuts against the contacting portion of second arm member to control the rotational arm so that when the platform is moving along the case between the first position and the second position, the retaining member does not interfere with the movement of the platform. Therefore, the user is not required to apply force against the spring of the retaining element unlike the cup holder in PTL 1.

Further since the retaining member does not interfere with the movement of the platform, a second urging portion having a strong urging force may be used to increase the urging force (retaining force) for retaining the cup.

BRIEF DESCRIPTION OF THE DRAWINGS

FIGS. 8A and 8B illustrate a variable depth conventional cup holder of PTL 1, wherein FIG. 8A is a perspective view thereof in an unused state and FIG. 8B is a perspective view thereof in a using state.

FIGS. 9A and 9B illustrate a variable depth conventional cup holder of PTL 2, wherein FIG. 9A is a perspective view thereof in an unused state and FIG. 9B is a perspective view thereof in a using state.

DETAILED DESCRIPTION OF THE EMBODIMENTS

Hereinafter, an embodiment for carrying out the invention is explained based on FIGS. 1-7. In an explanation, terms indicating the directions follow the directions shown by a direction key in FIG. 1. However, an arrangement of the cup holder according to the present embodiment is not limited to the aforementioned directions.

Figure 3:
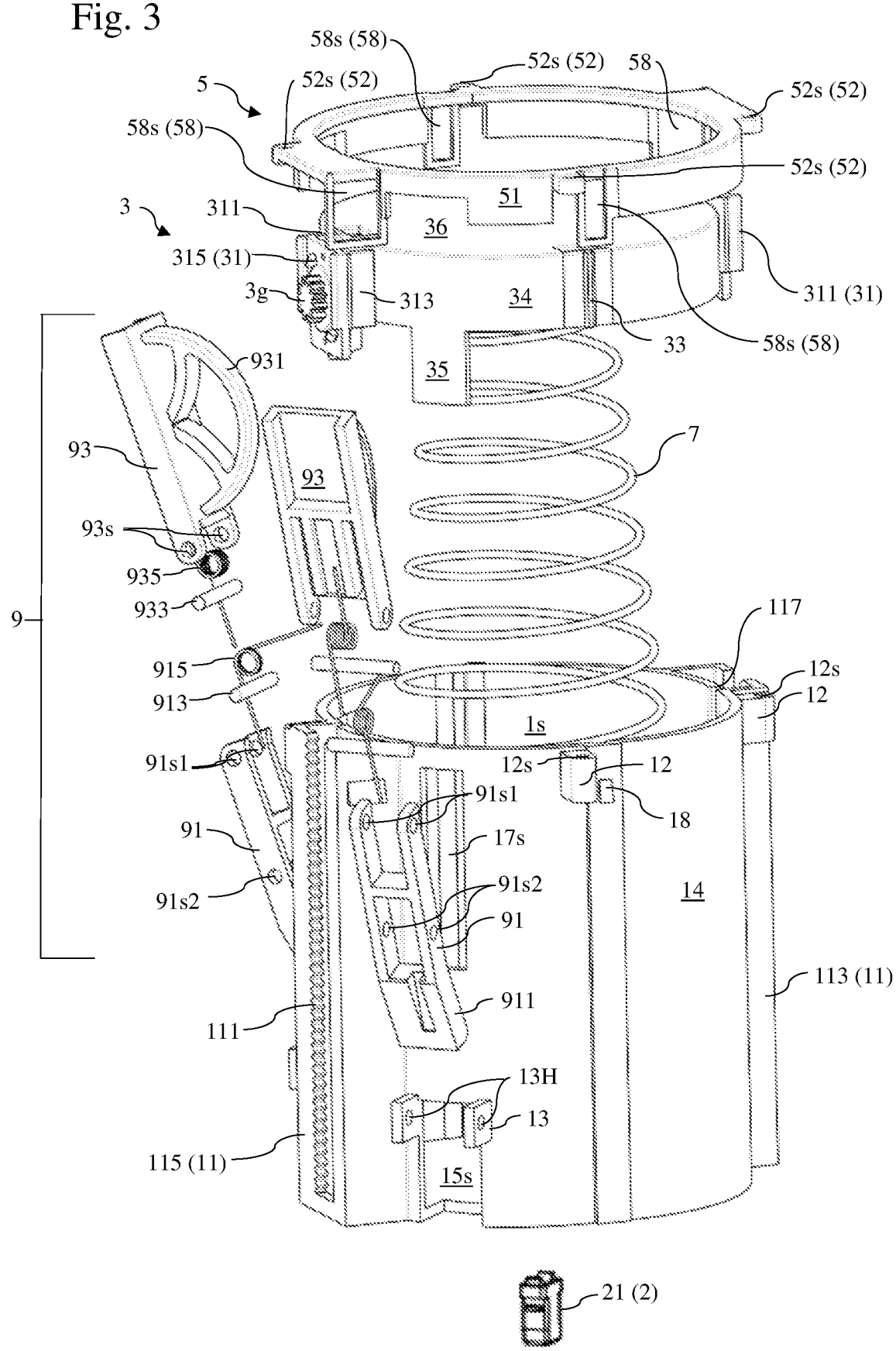
FIG. 3 is an exploded view thereof.

The cup holder of the present embodiment is structured to be installed in a center console of an automobile. As shown in FIG. 3, the cup holder according to the present embodiment includes a case 1, a platform 3 slidably arranged in the case 1, a latch unit 2 to latch the platform 3 and the case 1 when the cup C is placed inside the case 1, a cap 5 to retain the platform 3 within the case 1, a platform urging member 7 to urge the platform 3 toward the cap 5, and a rotational arm 9 to retain the cup C placed inside the case 1.

The case 1 is described in details in FIGS. 1-5.

Figure 2:
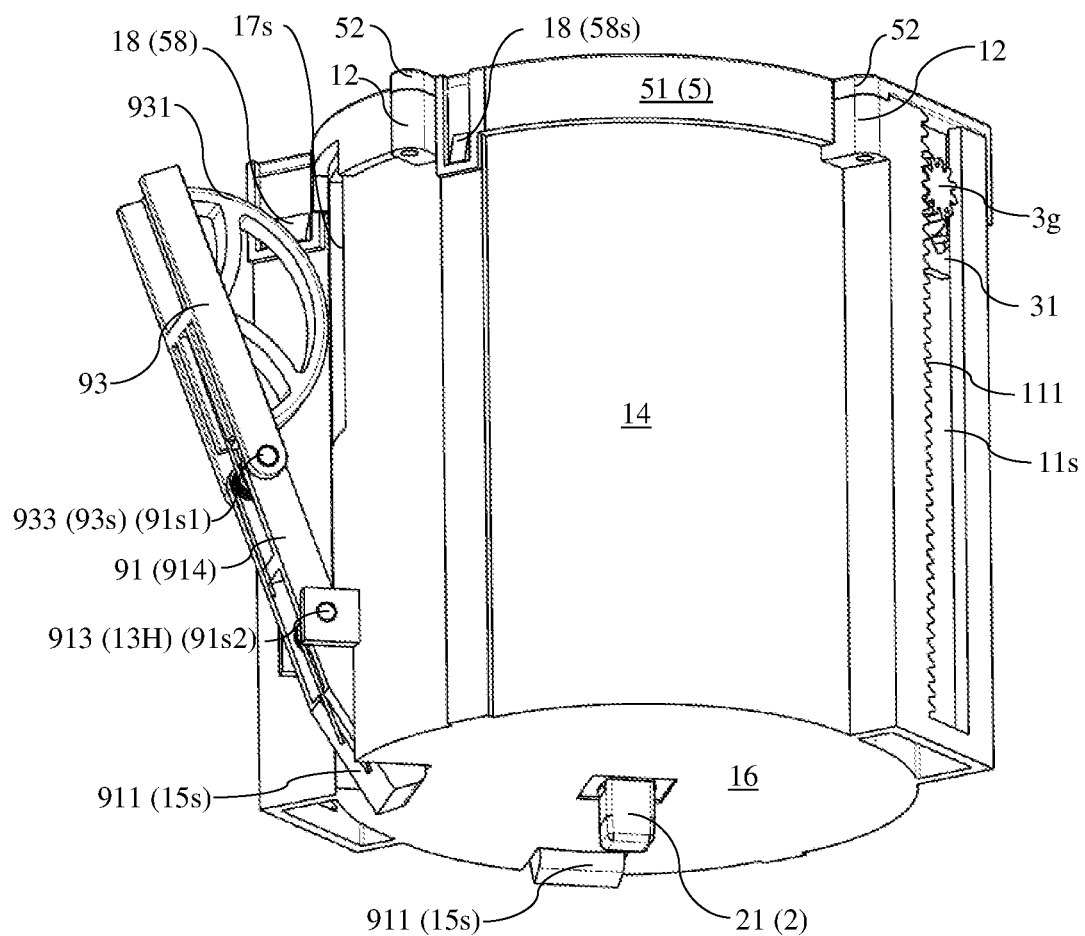
FIG. 2 is another perspective view thereof.
Figure 4:
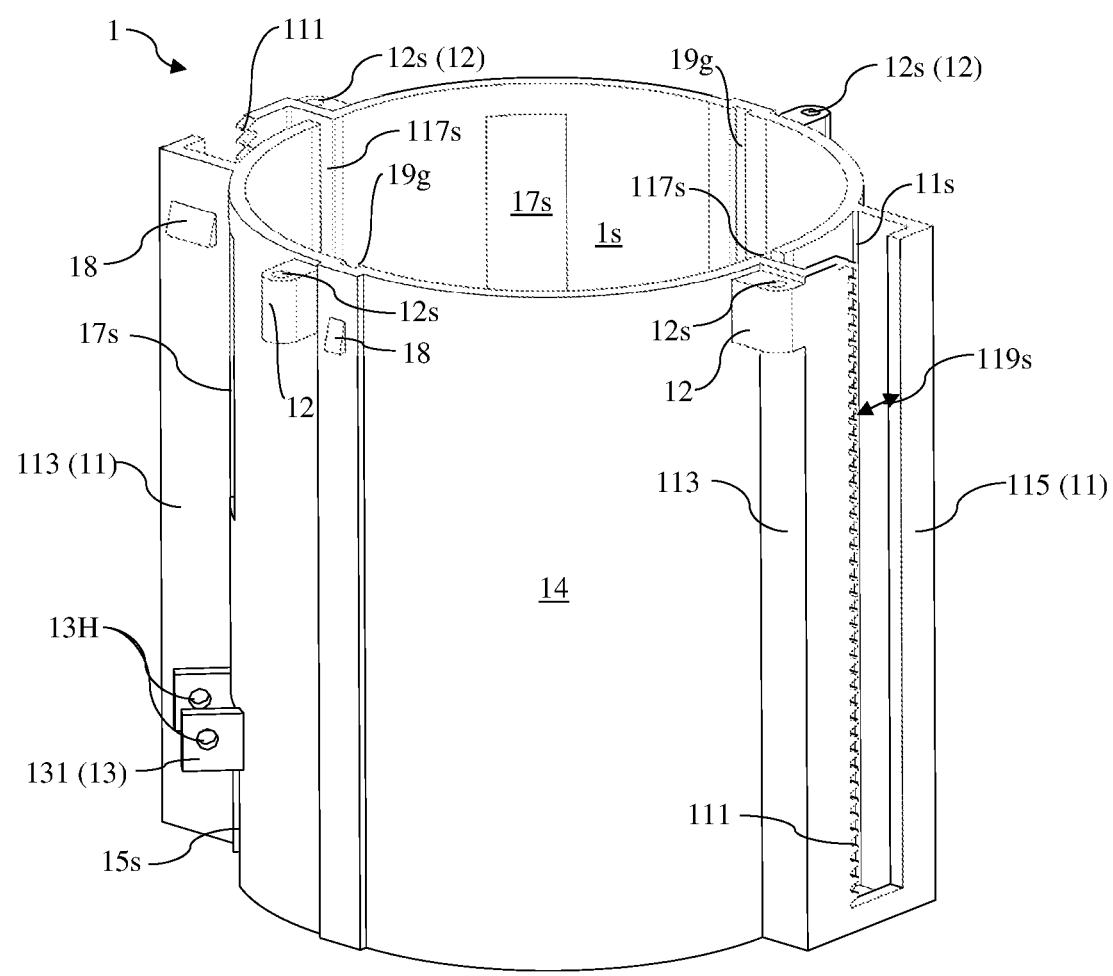
FIG. 4 is a perspective view of a case of the cup holder of the present embodiment.

As shown in FIGS. 2 and 4, the case 1 has a bottomed tubular body including a circumferential wall 14 and a bottom wall 16 wherein the circumferential wall 14 and the bottom wall 16 define a space 1s inside the case 1 for receiving a drinking cup or bottle.

As shown in FIG. 4, the circumferential wall 14 of the case 1 has a guide portion 11, a first cap connector 12, a hinge portion 13, an upper slot (first slot) 17s, a lower slot (second slot) 15s, and a second cap connector 18.

Figure 1:
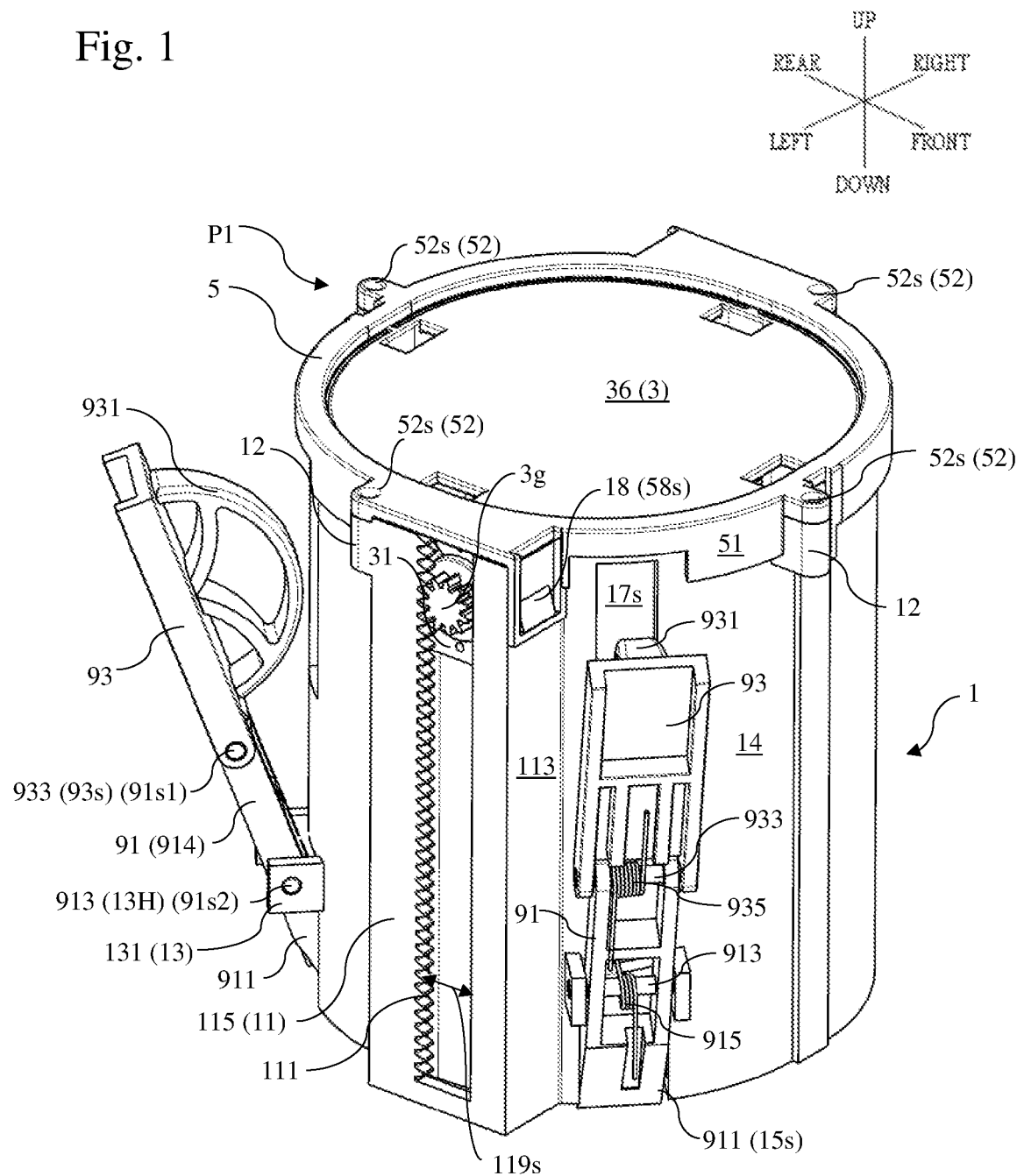
FIG. 1 is a perspective view of a cup holder of the present embodiment in an unused state.

The guide portion 11 is formed on an exterior of the circumferential wall 14 and extending in a vertical direction from an open end to the bottom wall 16. The guide portion 11 houses a damper housing 31 of the platform 3, as shown in FIGS. 1-3.

More specifically, in the present embodiment, two guide portions 11 are provided on the circumferential wall 14 opposite to each other in a radial direction of the cup holder, as shown in FIGS. 3 and 4.

Each of the guide portions 11 is formed from a pair of sidewalls 113 extending from the exterior of the circumferential wall 14, and a connecting wall 115 connecting the pair of sidewalls 113. The circumferential wall 14, the pair of sidewalls 113 of the guide portion 11, and the connecting wall 115 of the guide portion 11 define a space 11s for housing the damper housing 31 of the platform 3, as shown in FIG. 4.

On each circumferential wall 14 facing the connecting wall 115 of the guide portion 11 and between the pair of sidewalls 113 of the guide portion 11, an arm slot 117s is formed. The arm slot 117s extends vertically along the circumferential wall 14 to allow an arm plate portion 311 of the damper housing 31 to slide therethrough, as shown in FIG. 3.

The connecting wall 115 of the guide portion 11 includes an opening 119s extending vertically between an upper edge of the connecting wall 115 and a lower portion of the connecting wall 115, and communicating with the space 11s so that when the gear damper 3g is housed inside the space 1s of the guide portion 11, a gear portion of the gear damper 3g protrudes into the opening 119s of the connecting wall 115, as shown in FIGS. 1 and 4. Further, a plurality of teeth 111 is formed vertically along an edge of the connecting wall 115 adjacent to the opening 119s so that the gear portion of the gear damper 3g protruding into the opening 119s engages the plurality of teeth 111 and applies a dampening force during the movement of the platform 3.

At a lower side of the circumferential wall 14, the hinge portion 13 is provided to rotatably connect the rotational arm 9 to the case 1, as shown in FIGS. 1-5.

Figure 5:
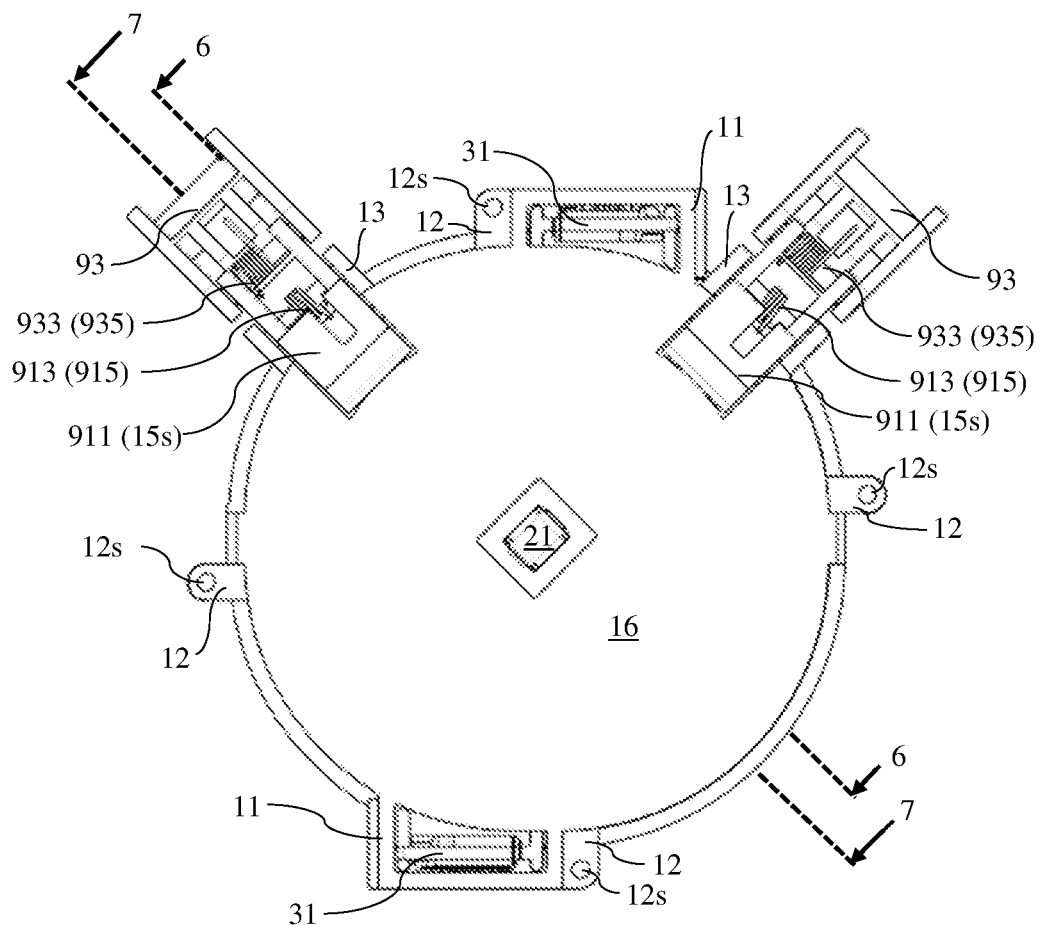
FIG. 5 is a bottom view of the cup holder of the present embodiment in the unused state.

More specifically, in the present embodiment, the case 1 includes two hinge portions 13 with about 90° therebetween in a circumferential direction of the cup holder, as shown in FIG. 5. Each of the hinge portions 13 includes a pair of plate portions 131 protruding from the exterior of the circumferential wall 14 and facing each other with a space therebetween. Each plate portion 131 has a through-hole 13H and rotatably connects the rotational arm 9 to the case 1.

At an upper side of circumferential wall 14 between the hinge portion 13 and the open end of the case 1, an upper slot 17s is formed to allow a retaining member 931 of the rotational arm 9 described later to enter the space 1s of the case 1. In the present embodiment, since the number of upper slots 17s corresponds to the number of rotational arms 9, the cup holder includes two upper slots 17s, as shown in FIGS. 1-4.

Figure 7:
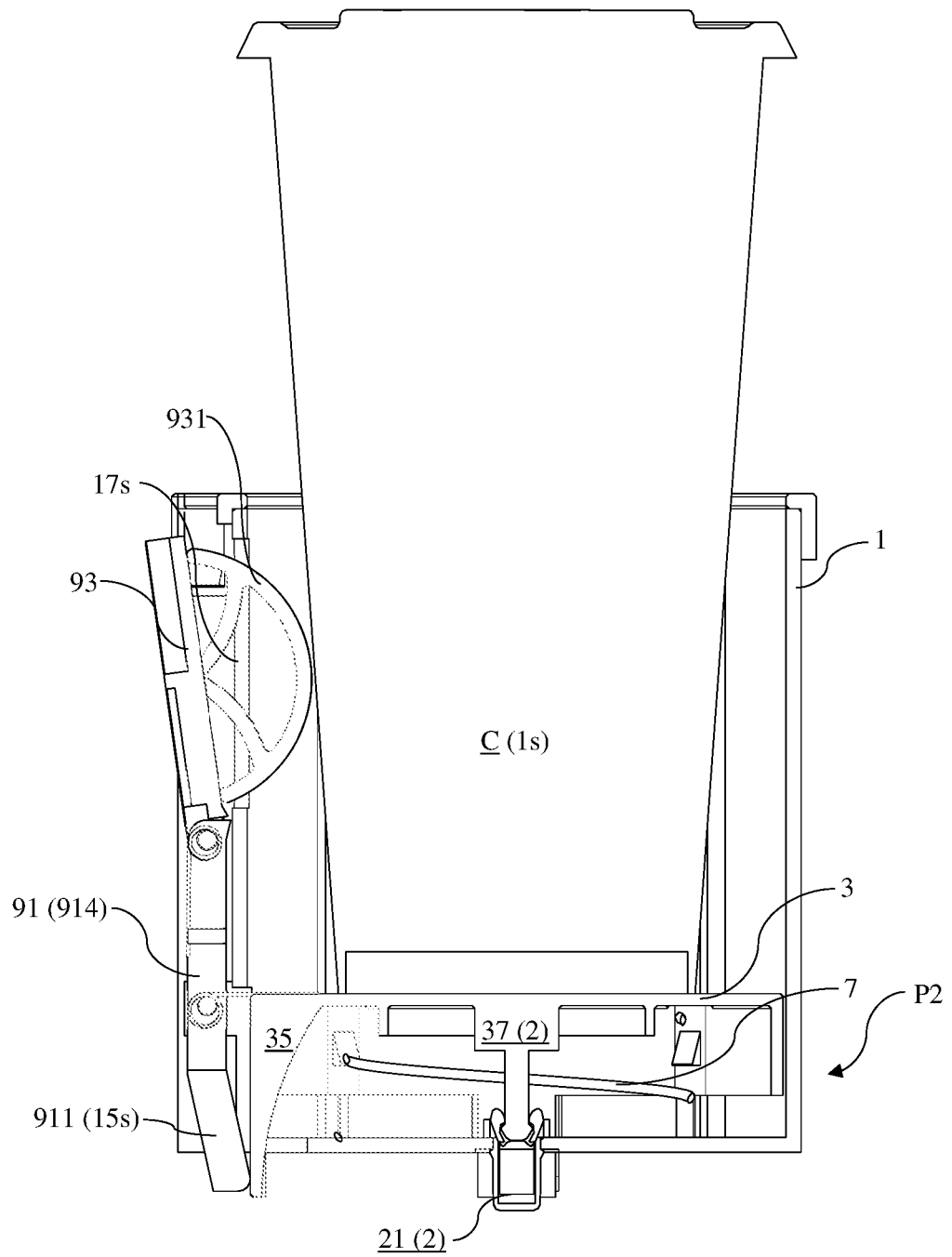
FIG. 7 is a cross-sectional view thereof taken along the line 7-7 in FIG. 5 in a using state.
Figure 8A:
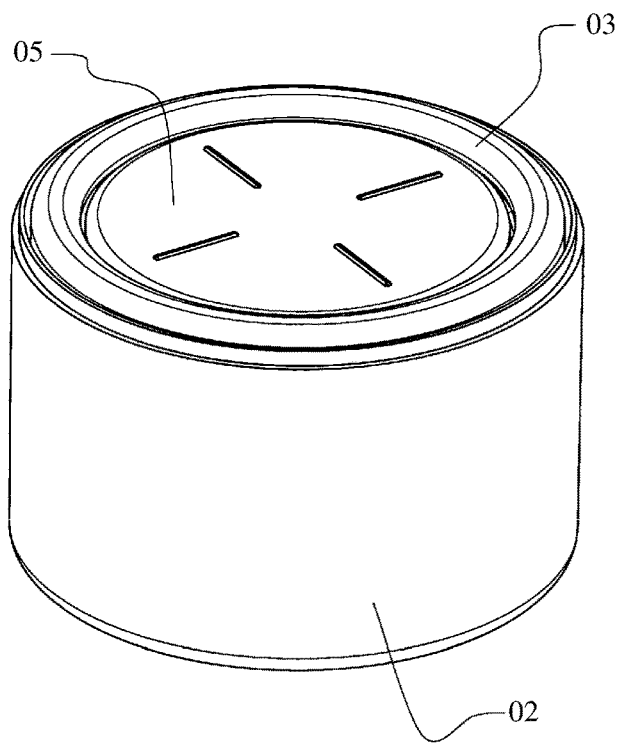
Figure 8B:
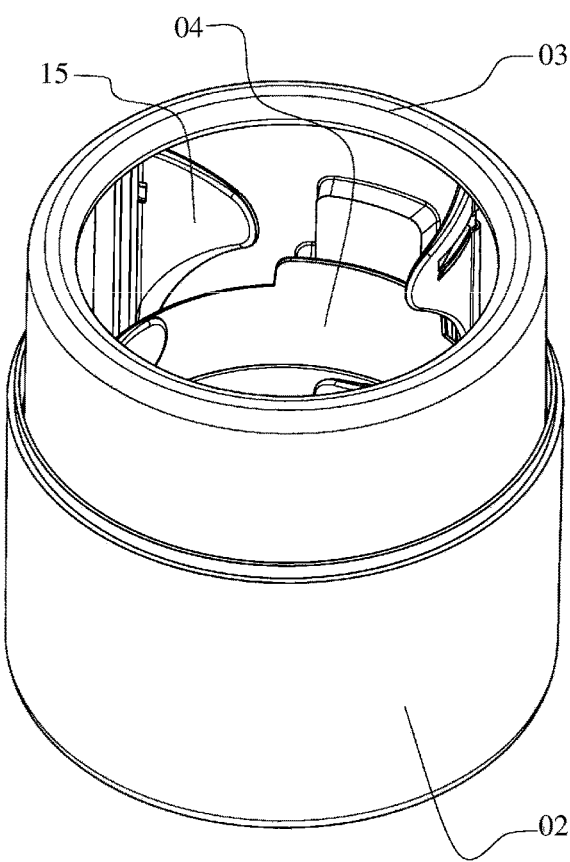
Figure 9A:
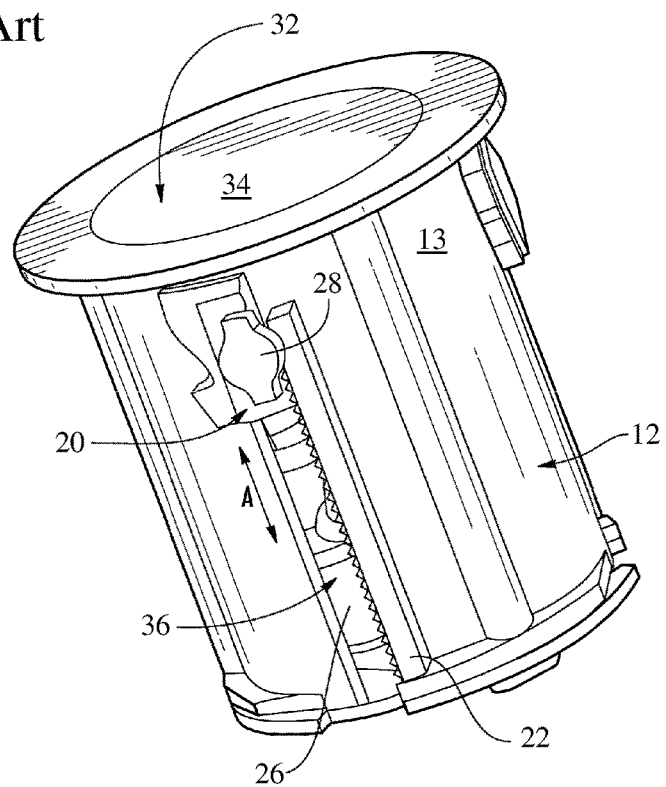
Figure 9B:
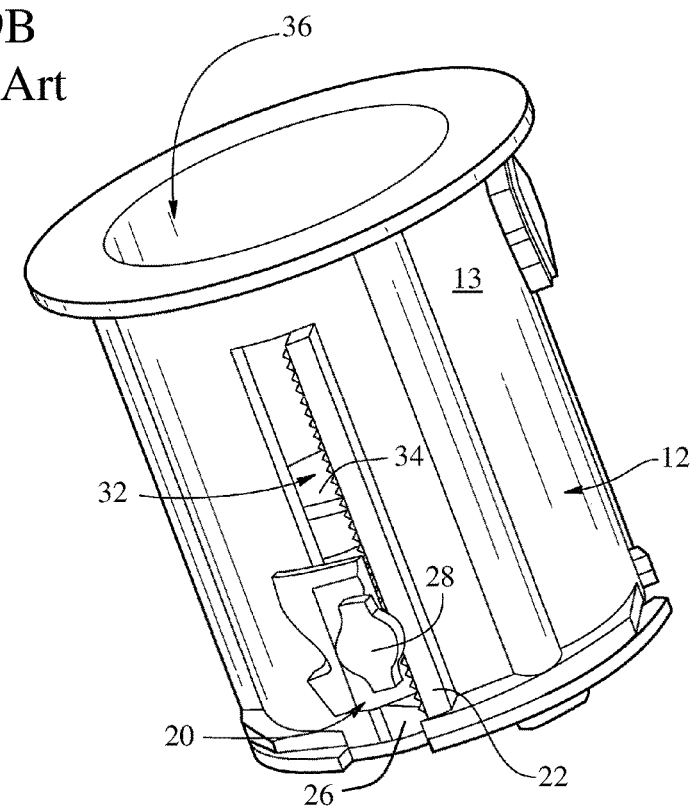

Below the hinge portion 13, a lower slot 15s is formed extending partially into the bottom wall 16 as shown in FIGS. 2 and 5. The lower slot 15s communicates with the space 1s to allow the rotational arm 9 to enter the space 1s. In addition, the lower slot 15s is capable of receiving an abutting portion 35 of the platform 3 simultaneously with the rotational arm 9 when the platform 3 is at the bottom wall 16, as shown in FIG. 7. In the present embodiment, since the number of lower slots 15s corresponds to the number of rotational arms 9, the cup holder includes two lower slots 15s as shown in FIGS. 1-5.

At the upper side of the circumferential wall 14, a first cap connector 12 and a second cap connector 18 are provided to attach the cap 5 onto the case 1, as shown in FIGS. 1-4.

The first cap connector 12 includes a through-hole 12s facing the cap 5 so that the through-hole 12s of the first cap connector 12 and a through-hole 52s of the cap 5 are aligned to each other and a connecting piece, e.g. screw, is inserted therethrough to fix the cap 5 to the case 1.

The second cap connector 18 is a protrusion having an inclined surface gradually inclining outwardly along a downward direction so that a second case connector 58 of the cap 5 slides along the inclined surface of the second cap connector 18 and snap fits onto the case 1 from the open end of the case 1 as shown in FIG. 1.

In the present embodiment, four first cap connectors 12 and four second cap connectors 18 are provided. However, the present invention, not limited to this, may have more or less than four first cap connectors 12 and second cap connectors 18 to attach the cap 5 onto the case 1.

On an inner surface of the circumferential wall 14 of the case 1, a guiding groove 19g is formed extending vertically from the open end of the case 1 to the bottom wall 16, as shown in FIG. 4. The guiding groove 19g allows a guided portion 33 of the platform 3 to slide therethrough to prevent rattling and to keep the surface of platform 3 level, which allows smoother movement of platform 3. In the present embodiment, two guiding grooves 19g are formed opposite to each other in the radial direction of the case 1. However, the present invention, not limited to this, may have more or less than two guiding grooves 19g.

Next, the platform 3 is described in details in FIGS. 1, 3, 6, and 7.

Figure 6:
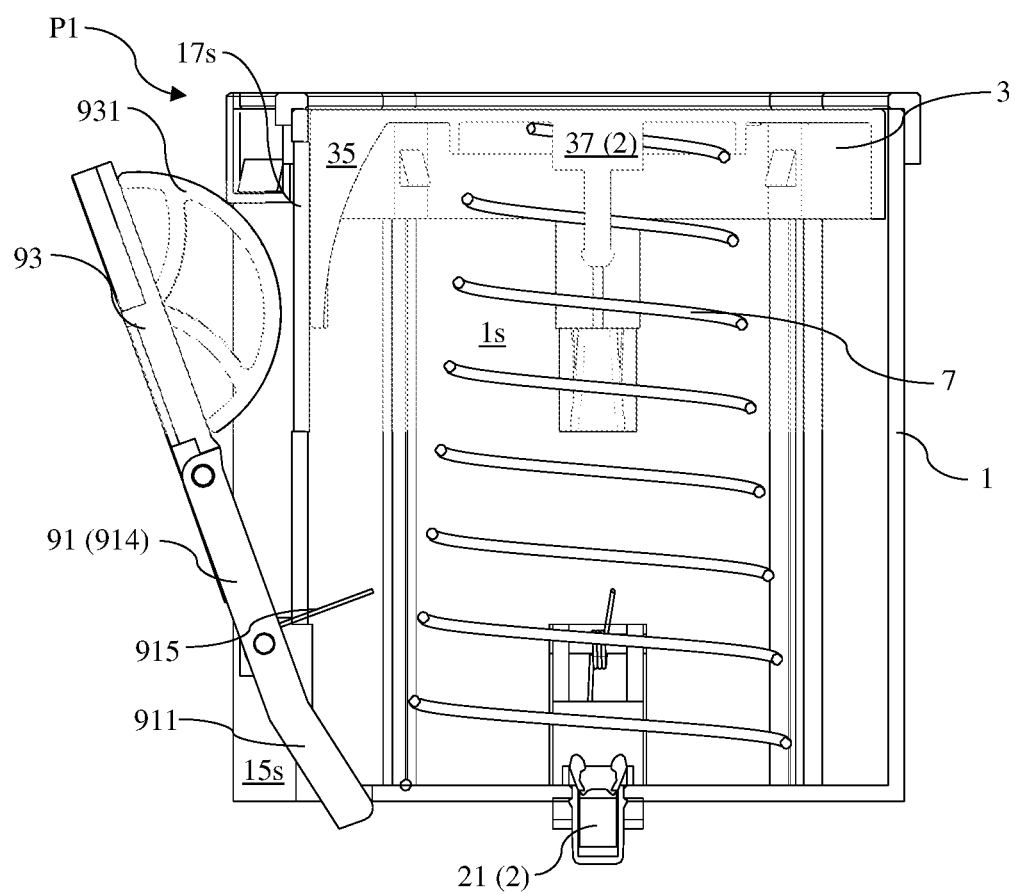
FIG. 6 is a cross-sectional view thereof taken along the line 6-6 in FIG. 5.

The platform 3 is slidably arranged in the case 1 to move between a first position P1 in which the platform 3 is positioned at the open end of the case 1 to cover the opening, and a second position P2 in which the platform 3 is positioned at the bottom of the case 1 to receive the cup C, as shown in FIGS. 6 and 7. The platform 3 includes a main wall 36 having a disc-shape and a circumferential sidewall 34 extending below the main wall 36 as shown in FIG. 3.

The main wall 36 of the platform 3 acts as a cover of the case 1 when the platform 3 is in the first position P1, and acts as the bottom of the case 1 when the platform 3 is in the second position P2. Thus, the main wall 36 of the platform 3 has a diameter substantially equal to an inner diameter of the circumferential wall 14 of the case 1.

On the circumferential sidewall 34 of the platform 3, the damper housing 31, the guided portion 33, and an abutting portion 35 are provided, as shown in FIG. 3.

The damper housing 31 is provided on the circumferential sidewall 34 of the platform 3 to house the damper gear 3g. In the present embodiment, two damper housings 31 are provided on the platform 3 opposite to each other in respect to the main wall 36 of the platform 3 as shown in FIG. 3. Each damper housing 31 includes the arm plate portion 311 protruding radially outwardly from the circumferential sidewall 34 of the platform 3, a side plate portion 313 disposed parallel to the arm plate portion 311, and a housing plate portion 315 disposed between and connecting the arm plate portion 311 and the side plate portion 313. The arm plate portion 311, the side plate portion 313, the housing plate portion 315, and the circumferential sidewall 34 of the platform 3 define a space for housing the damper gear 3g. The housing plate portion 315 includes a hole to expose the gear portion of the damper gear 3g so that the damper gear 3g engages the plurality of teeth 111 of the guide portion 11 to damp the movement of the platform 3.

At a position different from the damper housings 31, the guided portion 33 is provided as shown in FIG. 3. In the present embodiment, two guided portions 33 are provided opposite to each other in a radial direction of the platform 3. Each guided portion 33 is a protrusion formed on the circumferential sidewall 34 of the platform 3 and extending in the vertical direction. Each guided portion 33 slides along the corresponding guiding groove 19g allowing the platform 3 to move smoothly inside the case 1.

At the bottom end of the circumferential sidewall 34 of the platform 3, the abutting portion 35 protrudes toward the bottom wall 16 to abut against the rotational arm 9, as shown in FIGS. 3, 6, and 7. In the present embodiment, two abutting portions 35 are provided to correspond to the two rotational arms 9.

Between the platform 3 and the bottom wall 16 of the case 1, the platform urging member 7 is provided, as shown in FIGS. 3, 6, and 7. The platform urging member 7 urges the platform 3 toward the open end of the case 1. The platform urging member 7 in the present embodiment is a conical spring, however, the present invention, not limited to this, may have any urging member to urge the platform 3 toward the open end of the case 1.

Next, the latch unit 2 is described in details in FIGS. 2, 3, and 5-7.

The latch unit 2 is provided to latch the platform 3 and the bottom wall 16 of the case 1 when the platform 3 is in the second position P2. The latch unit 2 includes a first latching member 37 provided on the main wall 36 of the platform 3 and a second latching member 21 provided at the bottom wall 16 of the case 1.

In the present embodiment, the latch unit 2 is a push-push latch wherein the first latching member 37 is a protrusion protruding toward the bottom wall 16 of the case 1, and the second latching member 21 has an opening facing the platform 3 to receive the first latching member 37. When the platform 3 moves from the first position P1 to the second position P2, the first latching member 37 penetrates the second latching member 21, and latches the second latching member 21; thereby, the first latching member 37 and the second latching member 21 are latched to each other in the second position P2. Then, in the second position P2, when the platform 3 is pushed downward to unlatch the first latching member 37 and the second latching member 21, the platform 3 is moved upward to the first position P1.

Next, the cap 5 is described in details in FIGS. 1-3.

The cap 5 is provided to retain the platform 3 in the space 1s of case 1. The cap 5 has a ring shape with a circumferential side wall 51 extending downwardly to partially cover the upper side of the case 1, and includes a first case connector 52 and a second case connector 58 to connect to the case 1, as shown in FIG. 3.

In the present embodiment, four first case connectors 52 are provided to correspond to four first cap connectors 12 as shown in FIGS. 1 and 3. Each first case connector 52 includes a through-hole 52s facing the case 1 so that the through-hole 12s of the first cap connector 12 and the through-hole 52s of the first case connector 52 are aligned to each other and the connecting piece, e.g. screw, is inserted therethrough to attach the cap 5 to the case 1.

In the present embodiment, four second case connectors 58 are provided to correspond to four second cap connectors 18 as shown in FIG. 3. Each second case connector 58 includes an opening 58s to attach to the second cap connector 18 of the case 1. The second case connector 58 slides along the inclined surface of the second cap connector 18, and hooks to the second cap connector 18 through the opening 58s of the second case connector 58.

Next, the rotational arms 9 are described in details in FIGS. 1-3 and 5-7.

The rotational arm 9 is rotatably connected to the case 1 through the hinge portion 13. The rotational arm 9 includes a lower arm member (first arm member) 91 rotatably connected to the case 1, and an upper arm member (second arm member) 93 rotatably connected to the lower arm member 91 as shown in FIG. 1.

The lower arm member 91 includes a body portion 914 aligned to the upper arm member 93 and a contacting portion 911 extending from the body portion 914.

The body portion 914 of the lower arm member 91 includes a first through-hole 91s1 at one end to rotatably connect to the second arm member 93 and a second through-hole 91s2 at another end to rotatably connect to the hinge portion 13 of the case 1. The lower arm member 91 is arranged between the pair of plate portions 131 of the hinge portion 13 so that the second through-hole 91s2 and the through-hole 13H are aligned to each other and a lower shaft 913 is inserted therethrough to rotatably connect the lower arm member 91 to the case 1. A lower urging member (first urging portion) 915 is provided at the connection between the lower arm member 91 and the hinge portion 13 to urge the lower arm member 91 radially outwardly.

The contacting portion 911 of the lower arm member 91 extends from the body portion 914. The contacting portion 911 is inclined toward the case 1 relative to the body portion 914 of the lower arm member 91 to extend into the case 1 through the lower slot 15s and abuts against the abutting portion 35 of the platform 3.

As shown in FIG. 3, the upper arm member 93 has a through-hole 93s at an end opposite to a free end thereof to connect to the lower arm member 91. The through-hole 93s is aligned to the first through-hole 91s1 of the lower arm member 91 and an upper shaft 933 is inserted therethrough to rotatably connect the upper arm member 93 to the lower arm member 91. The upper arm member 93 and the lower arm member 91 are mutually aligned to each other, and an upper urging member (second urging portion) 935 is provided at the connection between the upper arm member 93 and the lower arm member 91 to apply an urging force radially inwardly to retain the cup C inside the space s1 of the case 1.

The upper arm member 93 further includes a retaining member 931 for retaining the cup C inserted into the space 1s of the case 1. In the present embodiment, the retaining member 931 has a semicircular shape protruding toward the case 1, which enters the space 1s of the case 1 through the upper slot 17s of the case 1.

In the present embodiment, two rotational arms 9 are provided; however, the present invention, not limited to this, may have more or less than two rotational arms 9 to retain the cup C inside the cup holder.

Next, an operation of the cup holder of the present embodiment is explained in details in FIGS. 6-7.

In the first position P1 as shown in FIG. 6, the platform 3 is positioned at the open end of the case 1 to cover the opening. The contacting portions 911 of lower arm members 91 extend inside the space 1s of the case 1 through the lower slots 15s and the upper arm members 93 are positioned outside of the case 1 so that the retaining member 931 is also outside of the case 1.

When the user uses the cup holder of the present embodiment, the cup C is inserted into the space 1s. The platform 3 moves from the first position P1 to the second position P2 by moving downward toward the bottom wall 16 of the case 1 against the urging force of the platform urging member 7. Each gear damper 3g housed inside the damper housing 31 rotates along the corresponding plurality of teeth 111 of guide portion 11. The abutting portion 35 of the platform 3 abuts against the contacting portion 911 of lower arm member 91 to rotate the lower arm member 91 towards the case 1. Each upper arm member rotates along with the lower arm member 91 so that the retaining member 931 enters the upper slot 17s of the case 1.

In the second position P2 as shown in FIG. 7, the platform reaches the bottom wall 16 of the case 1, and the first latching member 37 of the platform 3 latches to the second latching member 21 at the bottom wall 16 of the case 1. Each retaining member 931 of the upper arm member 93 contacts the cup C inside the space 1s. Each upper urging member 935 urges the upper arm member 93 radially inwardly to apply an urging force to the cup C to retain the cup C. Thus, the cup C is retained in the cup holder accordingly.

Conversely, to close the cup holder, in other words, to move the platform 3 from the second position P2 to the first position P1, the user pushes the cup C downwardly to unlatch the first latching member 37 of the platform 3 from the second latching member 21. The platform urging member 7 urges the platform 3 upwardly to move the platform 3 upward. Each gear damper 3g housed inside the damper housing 31 rotates along the corresponding plurality of teeth 111 of guide portion 11. The abutting portion 35 of the platform 3 moves away from the contacting portion 911 of lower arm member 91, and the lower urging member 915 applies the urging force to rotate the lower arm member 91 radially outwardly away from the case 1. Simultaneously, each upper arm member 93 rotates along with the corresponding lower arm member 91 so that the retaining member 931 moves outside of the space 1s of the case 1.

Then as shown in FIG. 6, the platform 3 reaches the open end of the case 1 to cover the opening of the case 1.

Accordingly, the platform 3 is structured to move between the first and second positions P1, P2 without abutting the retaining members 931. Therefore, the upper urging member 935 may have an urging force greater than that of the lower urging member 915 so that an urging member with a strong retaining force may be used for the retaining member of the present invention. Thus, the cup is retained with a high retaining force by the retaining members without altering the urging force of the platform urging member.

The above description simply illustrates the principle of the invention. Furthermore, a great number of modifications and alterations are possible for those skilled in the art, and the invention not being limited to the heretofore illustrated and described exact configurations and applications, all corresponding modification examples and equivalents are deemed to be within the scope of the invention defined by the attached claims and their equivalents.

What is claimed is:

1. A cup holder for holding a cup, comprising:
   a case for receiving the cup, having an opening and a bottom opposite to the opening;
   a rotational arm rotatably connected to the case, and including
      a first arm member rotatably connected to the case, and
      a second arm member rotatably connected to the first arm member, and having a retaining member protruding toward the case for retaining the cup;
   a platform slidably arranged in the case to move between a first position in which the platform is positioned at the opening of the case, and a second position in which the platform is positioned at the bottom of the case, the platform having an abutting portion extending downwardly therefrom to abut against the first arm member; and
   a latch unit to latch the platform and the bottom of the case when the platform is in the second position,
   wherein when the platform moves from the first position to the second position, the abutting portion abuts against the first arm member to rotate the rotational arm toward the case and the retaining member is disposed inside the case.

2. A cup holder according to claim 1, wherein the first arm member includes
   a body portion aligned to the second arm member, and having a first end rotatably connected to the second arm member and a second end rotatably connected to an outer surface of the case, and
   a contacting portion extending from the second end of the body portion to the inside of the case to abut against the abutting portion of the platform.

3. A cup holder according to claim 2, wherein the rotational arm further comprises a first urging portion disposed between the first arm member and the case for applying an urging force to the rotational arm in a direction away from the case, and a second urging portion disposed between the first arm member and the second arm member for applying an urging force to the second arm member toward the inside of the case, and
   the urging force of the second urging portion is greater than that of the first urging portion.

4. A cup holder according to claim 3, further comprising:
   an urging member arranged between the platform and the case to urge the platform toward the opening of the case,
   wherein when the platform is in the first position, the retaining member of the second arm member is outside of the case and the contacting portion of the first arm member is inside the case,
   when the platform moves from the first position to the second position, the platform is moved against an urging force of the urging member and the abutting portion of the platform abuts against the contacting portion of the first arm member to rotate the rotational arm toward the case,
   when the platform is in the second position, the platform is latched to the bottom of the case through the latch unit and the retaining member of the second arm member protrudes inside the case for retaining the cup, and
   when the platform moves from the second position to the first position, the platform is unlatched from the bottom of the case and the urging member urges the platform to move toward the opening of the case and rotate the rotational arm away from the case.

5. A cup holder according to claim 4, wherein the case further comprises
   a first slot arranged between the opening of the case and the bottom of the case, to allow the retaining member of the second arm member to enter inside the case, and
   a second slot arranged under the first slot and extending into the bottom, to allow the contacting portion of the first arm member to enter inside the case,
   wherein when the platform is in the first position, the contacting portion of the first arm member is disposed inside the case through the second slot to abut against the abutting portion of the platform, and when the platform is in the second position, the retaining member of the second arm member protrudes inside the case through the first slot for retaining the cup.

6. A cup holder according to claim 5, wherein the case further comprises a guide portion arranged on the outer surface of the case and having a plurality of teeth extending from the opening of the case to the bottom of the case, and
   the platform further comprises a gear arranged on an outer surface of the platform to engage the plurality of teeth of the guide portion.

7. A cup holder according to claim 6, wherein the retaining member of the second arm member has a semi-circular shape protruding toward the case.

* * * * *